United States Patent
Jose et al.

(10) Patent No.: US 10,045,221 B2
(45) Date of Patent: Aug. 7, 2018

(54) TCP ENHANCEMENT WITH LIMITED LICENSED CHANNEL USAGE FOR WIRELESS NETWORKS

(71) Applicant: QUALCOMM Incorporated, San Diego, CA (US)

(72) Inventors: Jubin Jose, Bound Brook, NJ (US); Junyi Li, Chester, NJ (US); Assaf Touboul, Natanya (IL)

(73) Assignee: QUALCOMM, Incorporated, San Diego, CA (US)

( * ) Notice: Subject to any disclaimer, the term of this patent is extended or adjusted under 35 U.S.C. 154(b) by 233 days.

(21) Appl. No.: 14/132,360

(22) Filed: Dec. 18, 2013

(65) Prior Publication Data

US 2015/0172931 A1    Jun. 18, 2015

(51) Int. Cl.
*H04W 16/14* (2009.01)
*H04W 16/12* (2009.01)
(Continued)

(52) U.S. Cl.
CPC ............... *H04W 16/14* (2013.01); *H04L 1/16* (2013.01); *H04L 1/188* (2013.01); *H04L 1/22* (2013.01);
(Continued)

(58) Field of Classification Search
None
See application file for complete search history.

(56) References Cited

U.S. PATENT DOCUMENTS 8,126,473 B1 * 2/2012 Kim ................ H04L 12/40045
455/422.1
8,248,996 B2    8/2012 Li et al.
(Continued)

FOREIGN PATENT DOCUMENTS

| EP | 2475219 A1 | 7/2012 |
| WO | WO-2006012018 A1 | 2/2006 |
| WO | WO-2013104951 A1 | 7/2013 |

OTHER PUBLICATIONS

ISA/EPO, International Search Report and Written Opinion of the International Searching Authority, Int'l App. No. PCT/US2014/069044, dated Mar. 26, 2015, European Patent Office, Rijswijk, NL, 11 pgs.

(Continued)

*Primary Examiner* — Noel R Beharry
*Assistant Examiner* — Ruihua Zhang
(74) *Attorney, Agent, or Firm* — Holland & Hart LLP/Qualcomm

(57) ABSTRACT

Methods, systems, and devices are described for operating a communications system using both licensed and unlicensed frequency bands. Unlicensed spectrum may be used as a primary band for transmitting data packets and TCP may be implemented for selectively transmitting (e.g., retransmitting) a subset of the transmitted data packets via licensed spectrum. Selective transmission of the subset of data packets via licensed spectrum may be based on a transmitter failing to receive and acknowledgment (ACK) message in response to one or more transmitted data packets on the unlicensed spectrum. Selective retransmission may be based on a transmitter detecting interference and/or it may be based on a receiver reporting information about channel conditions. In some cases, a transmitter may simultaneously receive channel condition information for both licensed and unlicensed spectrum. In other cases, unlicensed spectrum (Continued)

may be utilized for data packet transmission and licensed spectrum may be utilized for ACK messages.

26 Claims, 13 Drawing Sheets

(51) Int. Cl.
  *H04L 1/16* (2006.01)
  *H04L 29/06* (2006.01)
  *H04L 1/18* (2006.01)
  *H04L 1/22* (2006.01)
  *H04W 88/06* (2009.01)
(52) U.S. Cl.
  CPC ............ *H04L 69/16* (2013.01); *H04W 16/12* (2013.01); *H04W 88/06* (2013.01)

(56) References Cited

U.S. PATENT DOCUMENTS

| | | | | |
|---|---|---|---|---|
| 8,839,065 B2* | 9/2014 | Rajapakse | ........... | H04L 65/4076 714/748 |
| 9,680,948 B2* | 6/2017 | Sigoure | ................... | H04L 67/28 |
| 9,794,294 B2* | 10/2017 | Hoole | ..................... | H04L 63/20 |
| 2004/0047324 A1* | 3/2004 | Diener | ......................... | 370/338 |
| 2005/0010694 A1* | 1/2005 | Ma et al. | ....................... | 709/250 |
| 2006/0160551 A1* | 7/2006 | Matoba et al. | ................ | 455/509 |
| 2007/0026868 A1 | 2/2007 | Schulz et al. | | |
| 2007/0054622 A1* | 3/2007 | Berkman | ................... | 455/67.11 |
| 2008/0170536 A1* | 7/2008 | Marshack et al. | ............ | 370/316 |
| 2009/0190608 A1* | 7/2009 | Kawamoto | .................... | 370/464 |
| 2009/0279491 A1* | 11/2009 | Kim et al. | ..................... | 370/329 |
| 2011/0019541 A1* | 1/2011 | Li | ....................... | H04W 72/085 370/230 |
| 2011/0028102 A1* | 2/2011 | Li | ..................... | H04W 74/0816 455/71 |
| 2011/0299511 A1* | 12/2011 | Cook | ............................ | 370/338 |
| 2012/0127938 A1* | 5/2012 | Lv et al. | ....................... | 370/329 |
| 2012/0281548 A1 | 11/2012 | Lin et al. | | |
| 2012/0307748 A1* | 12/2012 | Cheng et al. | ................. | 370/329 |
| 2013/0012251 A1* | 1/2013 | Roddy | ................... | H04W 28/08 455/509 |
| 2013/0143502 A1 | 6/2013 | Kazmi et al. | | |
| 2013/0155991 A1 | 6/2013 | Kazmi et al. | | |
| 2013/0188552 A1 | 7/2013 | Kazmi et al. | | |
| 2014/0148169 A1* | 5/2014 | Li | ..................... | H04W 36/0061 455/437 |
| 2014/0325064 A1* | 10/2014 | Johansson | ............... | H04L 47/12 709/225 |

OTHER PUBLICATIONS

IPEA/EPO, Second Written Opinion of the International Preliminary Examining Authority, Int'l App. No. PCT/US2014/069044, dated Nov. 18, 2015, European Patent Office, Rijswijk, NL, 6 pgs.

* cited by examiner

TCP ENHANCEMENT WITH LIMITED LICENSED CHANNEL USAGE FOR WIRELESS NETWORKS

BACKGROUND

The following relates generally to wireless communication, and more specifically to operating communication systems using both licensed and unlicensed frequency bands. Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations, each simultaneously supporting communication for multiple mobile devices. Base stations may communicate with mobile devices on downstream and upstream links. Each base station has a coverage range, which may be referred to as the coverage area of the cell. Small cells are increasingly being deployed to address wireless capacity and coverage limitations in cellular networks. In some cases, small cells cannot be connected to a wireless network through a dedicated wired backhaul. Non-line-of-sight (NLOS) wireless backhaul presents one possible solution; however, both licensed and unlicensed spectrum each present challenges to wireless backhaul implementations. For example, licensed spectrum may have limited availability, and its use may be cost prohibitive. Unlicensed spectrum, while possibly more readily available than licensed spectrum, may be susceptible to burdensome interference.

SUMMARY

The described features generally relate to one or more improved systems, methods, and apparatuses for operating a communications system using both a licensed frequency band and an unlicensed frequency band. Unlicensed spectrum may be used as a primary band for transmitting data packets and licensed spectrum may be implemented for selectively transmitting (e.g., retransmitting) a subset of the transmitted data packets.

In some embodiments, a method of wireless communication includes transmitting a flow of data packets on an unlicensed frequency band and selectively transmitting a subset of the flow of data packets on a licensed frequency band.

In some embodiments, a system for wireless communication includes means for transmitting a flow of data packets on an unlicensed frequency band and means for selectively transmitting a subset of the flow of data packets on a licensed frequency band.

In some embodiments, an apparatus for wireless communication includes a processor, a memory in electronic communication with the processor, and instructions stored in the memory. The instructions may be executable by the processor to transmit a flow of data packets on an unlicensed frequency band and selectively transmit a subset of the flow of data packets on a licensed frequency band.

In some embodiments, a computer program product for wireless communication includes a non-transitory computer readable medium storing instructions executable by a processor to transmit a flow of data packets on an unlicensed frequency band and selectively transmit a subset of the flow of data packets on a licensed frequency band.

In certain examples of the method, system, apparatus, and/or computer program product, selectively transmitting the subset of the flow of data packets may include selectively retransmitting the subset of the flow of data packets on the licensed frequency band. Means for selectively transmitting the subset of the flow of data packets may include means for selectively retransmitting the subset of the flow of data packets on the licensed frequency band. Additionally or alternatively, they may include instructions executable to selectively retransmit the subset of the flow of data packets on the licensed frequency band.

In certain examples, the method, system, apparatus, and/or computer program product may also include steps for, means for, and/or instructions executable by a processor for determining if at least the subset of the flow of data packets was successfully received.

In certain examples of the method, system, apparatus, and/or computer program product, determining if at least the subset of the flow of data packets was successfully received may include determining whether an acknowledgment (ACK) message was received. Means for determining if at least the subset of the flow of data packets was successfully received may include means for determining whether an acknowledgment (ACK) message was received. Additionally or alternatively, instructions may include instructions executable by a processor to determine whether an acknowledgment (ACK) message was received.

In certain examples of the method, system, apparatus, and/or computer program product, selectively transmitting the subset of the flow of data packets on the licensed frequency band may include retransmitting at least the subset of the flow of data packets on the licensed frequency band when a number of unsuccessful transmissions on the unlicensed frequency band exceeds a threshold. Means for selectively transmitting the subset of the flow of data packets on the licensed frequency band may include means for retransmitting at least the subset of the flow of data packets on the licensed frequency band when a number of unsuccessful transmissions on the unlicensed frequency band exceeds a threshold. Additionally or alternatively, instructions may include instructions executable by the processor to retransmit at least the subset of the flow of data packets on the licensed frequency band when a number of unsuccessful transmissions on the unlicensed frequency band exceeds a threshold.

In certain examples, of the method, system, apparatus, and/or computer program product, selectively transmitting the subset of the flow of data packets on the licensed frequency band may include retransmitting at least the subset of the flow of data packets on the licensed frequency band when a time delay expires without receiving an acknowledgment (ACK) message. Means for selectively transmitting the subset of the flow of data packets on the licensed frequency band may include means for retransmitting at least the subset of the flow of data packets on the licensed frequency band when a time delay expires without receiving an acknowledgment (ACK) message. Additionally or alternatively, instructions may include instructions executable by a processor to retransmit at least the subset of the flow of data packets on the licensed frequency band when a time delay expires without receiving an acknowledgment (ACK) message.

In certain examples, the method, system, apparatus, and/or computer program product may also include steps for, means for, and/or instructions executable by a processor for monitoring channel conditions of the unlicensed frequency band and monitoring channel conditions of the licensed frequency band.

In certain examples, of the method, system, apparatus, and/or computer program product, monitoring the unlicensed frequency band and monitoring the licensed frequency band may be performed simultaneously. Means for monitoring the unlicensed frequency band and monitoring the licensed frequency band may include means for monitoring the unlicensed frequency band and monitoring the licensed frequency band simultaneously. Additionally or alternatively, instructions may include instructions executable by the processor to monitor the unlicensed frequency band and monitor the licensed frequency band simultaneously.

In certain examples, the method, system, apparatus, and/or computer program product may also include steps for, means for, and/or instructions executable by a processor for determining whether to transmit on the licensed frequency band or on the unlicensed frequency band based at least in part on the monitored channel conditions of the unlicensed frequency band or the monitored channel conditions of the licensed frequency band.

In certain examples, the method, system, apparatus, and/or computer program product may also include steps for, means for, and/or instructions executable by a processor for receiving an ACK message on the licensed frequency band.

In certain examples, of the method, system, apparatus, and/or computer program product, the flow of data packets may be Transmission Control Protocol (TCP) packets.

Further scope of the applicability of the described methods, systems, and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Improved systems, methods, and apparatuses for operating a communications system using both a licensed frequency band and an unlicensed frequency band are described. Unlicensed spectrum may be used as a primary band for transmitting data packets and licensed spectrum may be implemented for selectively transmitting (e.g., retransmitting) a subset of the transmitted data packets. In some cases, transmission control protocol (TCP) enhancements may be implemented to leverage the reliability of licensed spectrum networks, while capitalizing on the relative ubiquity of unlicensed spectrum networks. TCP may offer reliable end-to-end flow in data networks; and it may help alleviate network congestion issues.

Unlicensed spectrum may be used as a primary band for transmitting data packets and TCP may be implemented for selectively transmitting (e.g., retransmitting) a subset of the transmitted data packets via licensed spectrum. Selective transmission of the subset of data packets via licensed spectrum may be based on a transmitter failing to receive an acknowledgment (ACK) message in response to one or more transmitted data packets on the unlicensed spectrum. Selective retransmission may be based on a transmitter detecting interference and/or it may be based on a receiver reporting information about channel conditions. In some cases, a transmitter may simultaneously receive channel condition information for both licensed and unlicensed spectrum. In other cases, unlicensed spectrum may be utilized for data packet transmission and licensed spectrum may be utilized for ACK messages.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
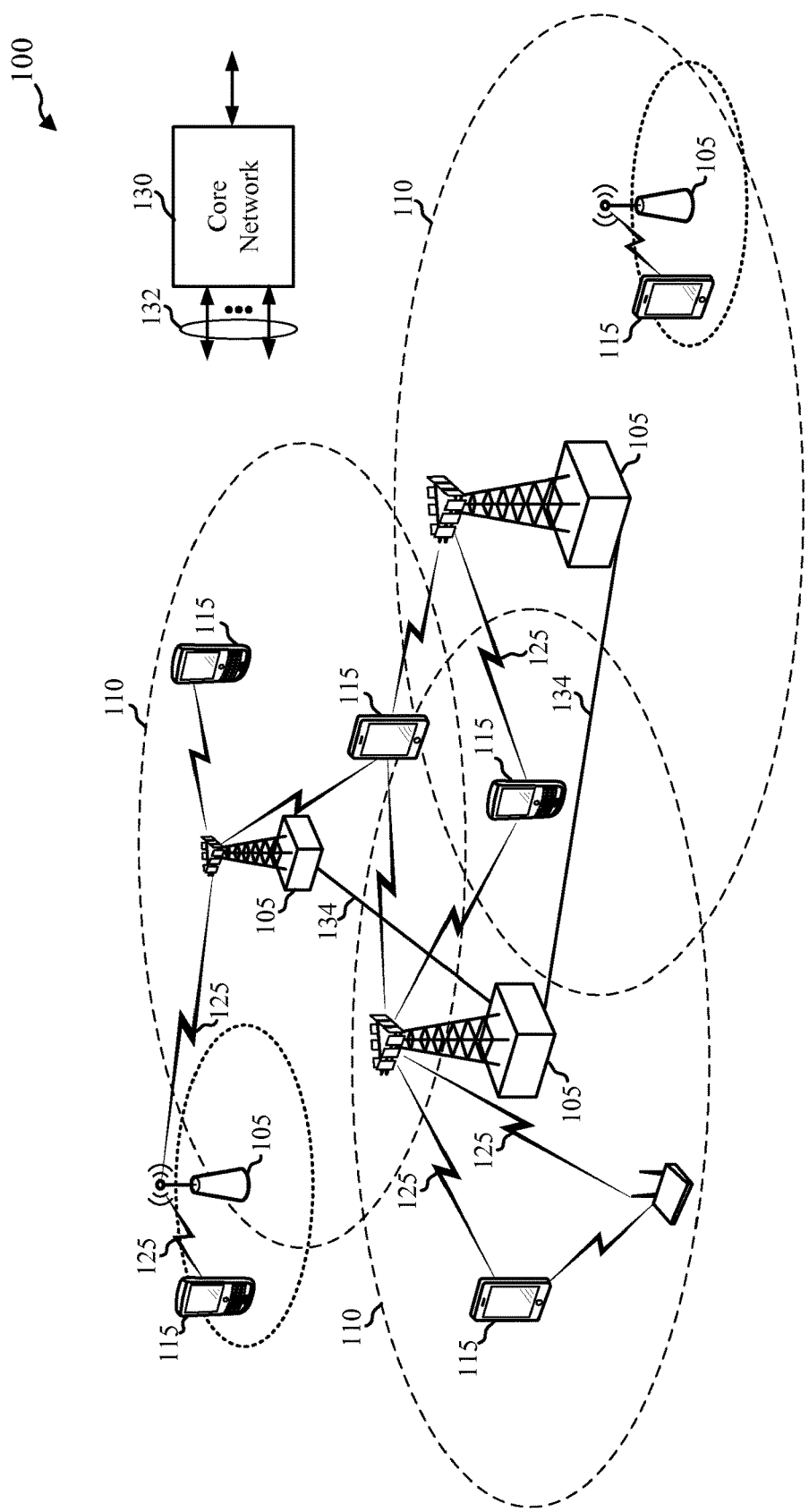
FIG. 1 shows a block diagram of a wireless communications system configured to operate according to various embodiments.

Referring first to FIG. 1, a diagram illustrates an example of a wireless communications system 100. The system 100 includes base stations (or cells) 105, communication devices 115, and a core network 130. The base stations 105 may communicate with the communication devices 115 under the control of a base station controller (not shown), which may be part of the core network 130 or the base stations 105 in various embodiments. Base stations 105 may communicate control information and/or user data with the core network 130 through backhaul links 132. Backhaul links 132 may be wired backhaul links (e.g., copper, fiber, etc.) and/or wireless backhaul links (e.g., microwave, etc.). In embodiments, the base stations 105 may communicate, either directly or indirectly, with each other over backhaul links 134, which may be wired or wireless communication links. The system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the devices 115 via one or more base station antennas. Each of the base station 105 sites may provide communication coverage for a respective coverage area 110. In some embodiments, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area 110 for a base station may be divided into sectors making up only a portion of the coverage area (not shown). The system 100 may include base stations 105 of different types (e.g., macro, micro, and/or pico base stations). There may be overlapping coverage areas for different technologies. Further, base stations 105 may communicate with the devices 115 using licensed frequency bands, unlicensed frequency bands, or both. As used herein, "licensed spectrum" and/or "licensed frequency bands" may refer to radio frequency bands reserved for licensed users. "Unlicensed spectrum" and/or "unlicensed frequency bands," as used herein, may refer to radio frequency bands that are generally open to public use without the necessity of a license.

Licensed frequency bands may be desirable since there may generally be less interference when compared to unlicensed frequency bands. For instance, because licensed frequency bands may only be used by a licensed user whereas unlicensed frequency bands may be used by anyone as long as they follow transmission power and other limits, the licensed bands may be subject to less traffic, and thus less interference. Nonetheless, unlicensed frequency bands may be desirable, for example, due to a limited availability of bandwidth on licensed frequency bands.

The communication devices 115 are dispersed throughout the wireless network 100, and each device may be stationary or mobile. A communication device 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a user equipment, a mobile client, a client, or some other suitable terminology. A communication device 115 may be a cellular phone, a personal digital assistant (PDA), a wireless modem, a wireless communication device, a handheld device, a tablet computer, a laptop computer, a cordless phone, a wireless local loop (WLL) station, or the like. A communication device may be able to communicate with macro base stations, pico base stations, femto base stations, relay base stations, and the like.

The transmission links 125 shown in network 100 may include uplink (UL) transmissions from a mobile device 115 to a base station 105, and/or downlink (DL) transmissions, from a base station 105 to a mobile device 115. The downlink transmissions may also be called forward link transmissions while the uplink transmissions may also be called reverse link transmissions.

In embodiments, the system 100 is an LTE/LTE-A network. In LTE/LTE-A networks, the terms evolved Node B (eNB) and user equipment (UE) may be generally used to describe the base stations 105 and communication devices 115, respectively. The system 100 may be a Heterogeneous LTE/LTE-A network in which different types of eNBs provide coverage for various geographical regions. For example, each eNB 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

Figure 2:
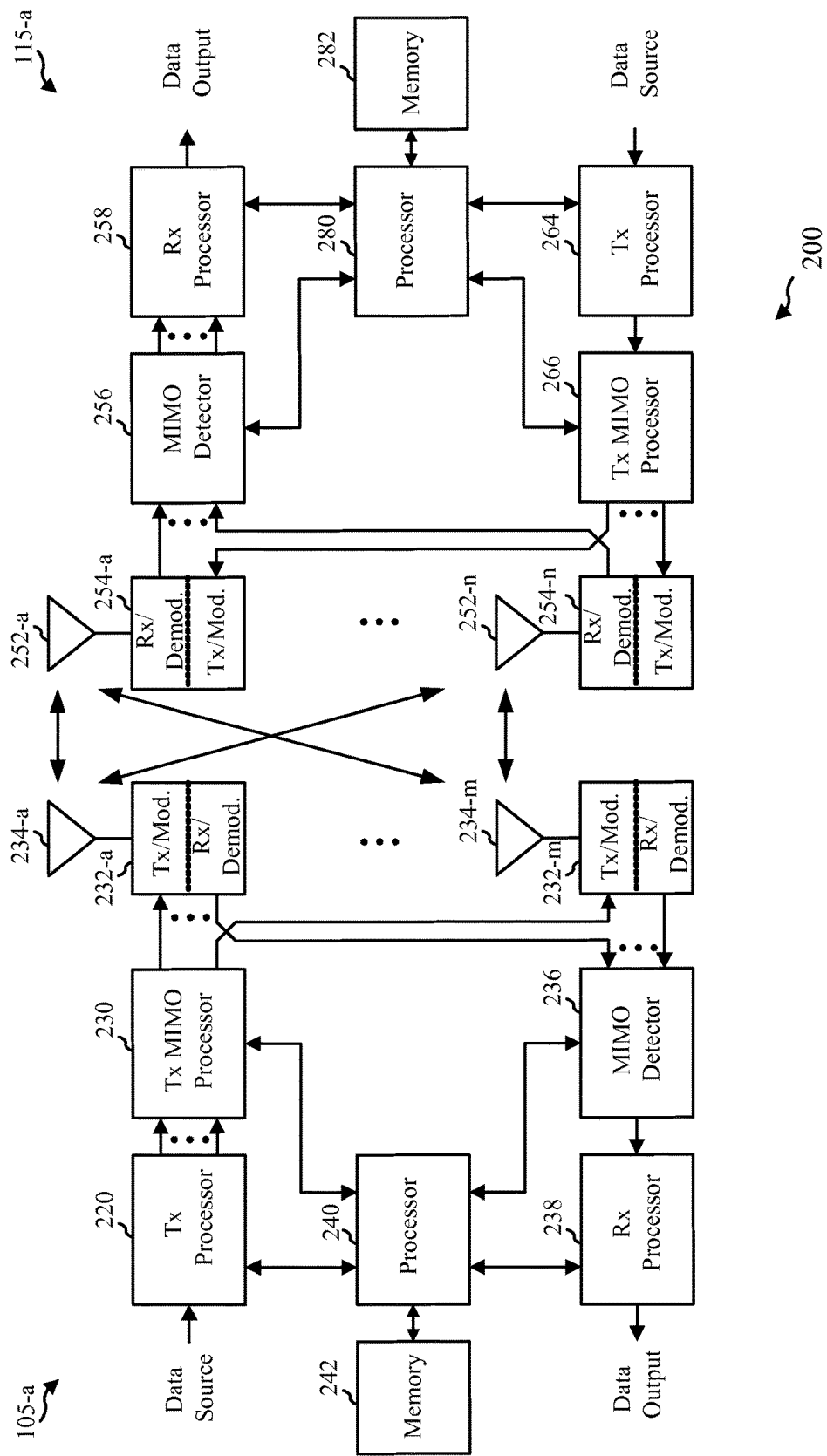
FIG. 2 shows a block diagram of an example of a multiple-input, multiple-output (MIMO) wireless communications system configured to operate according to various embodiments.

Next, referring to FIG. 2, a block diagram of a MIMO communication system 200 including a base station or eNB 105-a and a mobile device or UE 115-a is shown. The base station 105-a may be an example of the base stations 105 of FIG. 1, while the mobile device 115-a may be an example of the communication devices 115 of FIG. 1. This system 200 may illustrate aspects of the system 100 of FIG. 1. The base station 105-a may be equipped with M antennas 234-a through 234-m, and the mobile device 115-a may be equipped with N antennas 252-a through 252-n. In the system 200, the base station 105-a may employ multiple antenna techniques for transmission over communication links. For example, the base station 105-a may employ transmit diversity to improve robustness of transmissions received by the mobile device 115-a. The mobile device 115-a may employ receive diversity using multiple receive antennas to combine signals received at multiple antennas.

At the base station 105-a, a transmit (Tx) processor 220 may receive data from a data source. The transmit processor 220 may process the data. The transmit processor 220 may also generate reference symbols, and a cell-specific reference signal. A transmit (Tx) MIMO processor 230 may perform spatial processing (e.g., precoding) on data symbols, control symbols, and/or reference symbols, if applicable, and may provide output symbol streams to the transmit modulators 232-a through 232-m. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink (DL) signal. In one example, DL signals from modulators 232-a through 232-m may be transmitted via the antennas 234-a through 234-m, respectively. In some cases, modulators 232-a through 232-m may transmit signals via the antennas 234-a through 234-m on both licensed frequency band as well as unlicensed frequency bands.

At the mobile device 115-a, the mobile device antennas 252-a through 252-n may receive the DL signals from the base station 105-a and may provide the received signals to the demodulators 254-a through 254-n, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254-a through 254-n, perform MIMO detection on the received symbols if applicable, and provide detected symbols. A receive (Rx) processor 258 may process (e.g., demodulate, deinterleave, and decode) the detected symbols, providing decoded data for the mobile device 115-a to a data output, and provide decoded control information to a processor 280, or memory 282.

The base station 105-a and/or the mobile device 115-a may utilize licensed frequency bands and/or unlicensed frequency bands. By way of example, either processor 240 or processor 280, or both, may determine whether to transmit a signal, or flow of data packets, on a licensed frequency band or an unlicensed frequency band. In some cases, one or both processors 240 and 280 determine that a flow of data packets may be transmitted using an unlicensed frequency band, and/or that a subset of the flow of data packets should be transmitted using a licensed frequency band. One or both processors 240 and 280 may further determine that acknowledgment (ACK) messages should always be transmitted using the licensed frequency band.

On the uplink (UL), at the mobile device 115-a, a transmit (Tx) processor 264 may receive and process data from a data source or a processor 240 coupled with memory 242. The transmit processor 264 may also generate reference symbols for a reference signal. The symbols from the transmit processor 264 may be precoded by a transmit (Tx) MIMO processor 266 if applicable, further processed by the demodulators 254-a through 254-n (e.g., for SC-FDMA, etc.), and be transmitted to the base station 105-a in accordance with the transmission parameters received from the base station 105-a. At the base station 105-a, the UL signals from the mobile device 115-a may be received by the antennas 234, processed by the demodulators 232, detected by a MIMO detector 236 if applicable, and further processed by a receive (Rx) processor 238. The receive processor 238 may provide decoded data to a data output and to the processor 240.

The components of the base station 105-a may, individually or collectively, be implemented with one or more Application Specific Integrated Circuits (ASICs) adapted to perform some or all of the applicable functions in hardware. Each of the noted modules may be a means for performing one or more functions related to operation of the system 200. Similarly, the components of the mobile device 115-a may, individually or collectively, be implemented with one or more Application Specific Integrated Circuits (ASICs) adapted to perform some or all of the applicable functions in hardware. Each of the noted components may be a means for performing one or more functions related to operation of the system 200.

Figure 3A:
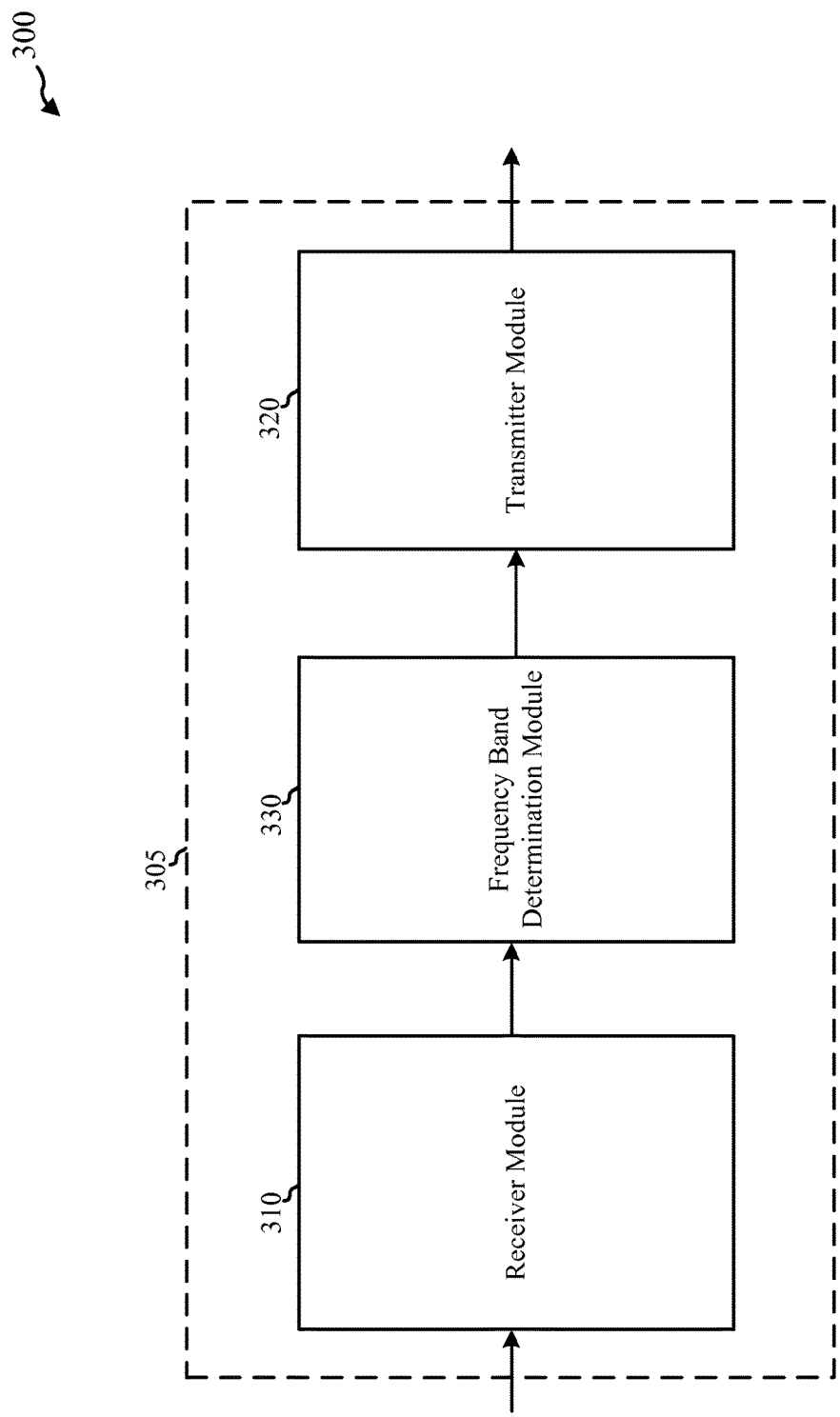
FIGS. 3A and 3B show block diagrams of a wireless communications device(s) configured to operate according to various embodiments.

Turning now to FIG. 3A, which shows a block diagram 300 of a device 305 configured to operate using either or both licensed frequency bands and unlicensed frequency bands, in accordance with various embodiments. The device 305 may illustrate, for example, aspects of UEs 115 illustrated in FIG. 1 or 2. Additionally or alternatively, the device 305 may illustrate aspects of the base stations 105 described with reference to FIG. 1 or 2. The device 305 may include a receiver module 310, a transmitter module 320, and/or a frequency band determination module 330. Each of these components may be in communication with one another. In some embodiments, the device 305 is a processor.

The components of the device 305 may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The device 305 may perform, or include means for performing, the functions described herein. In some embodiments, the receiver module 310 receives signals and/or performs measurements using a licensed frequency band and an unlicensed frequency band. The frequency band determination module 330 may process the received signals and/or measurements and evaluate what data packets are appropriate to be transmitted using the licensed frequency band and what data packets are appropriate to be transmitted using the unlicensed frequency band. This evaluation may occur only when a licensed frequency band and an unlicensed frequency band are both available for use.

In some cases, the frequency determination module 330 determines that a number of unsuccessful attempts at transmitting data packets using the unlicensed frequency band exceeds an unsuccessful transmission threshold, and it determines that the next retransmission attempt should occur using the licensed frequency band. In some cases, the frequency determination module 330 determines that a predetermined time delay has expired while attempting to transmit data packets using the unlicensed frequency band, and it determines that the next retransmission attempt should occur using the licensed frequency band.

The frequency determination module 330 may determine a subset of the flow of data packets to transmit using the licensed frequency band based on measurements, such as channel condition measurements, of the unlicensed frequency band and/or the licensed frequency band. Then, the frequency band determination module 330 or the transmitter module 320, or a combination of the two, may establish a radio link using the licensed frequency band and/or the unlicensed frequency band with another device based on the determination.

Figure 3B:
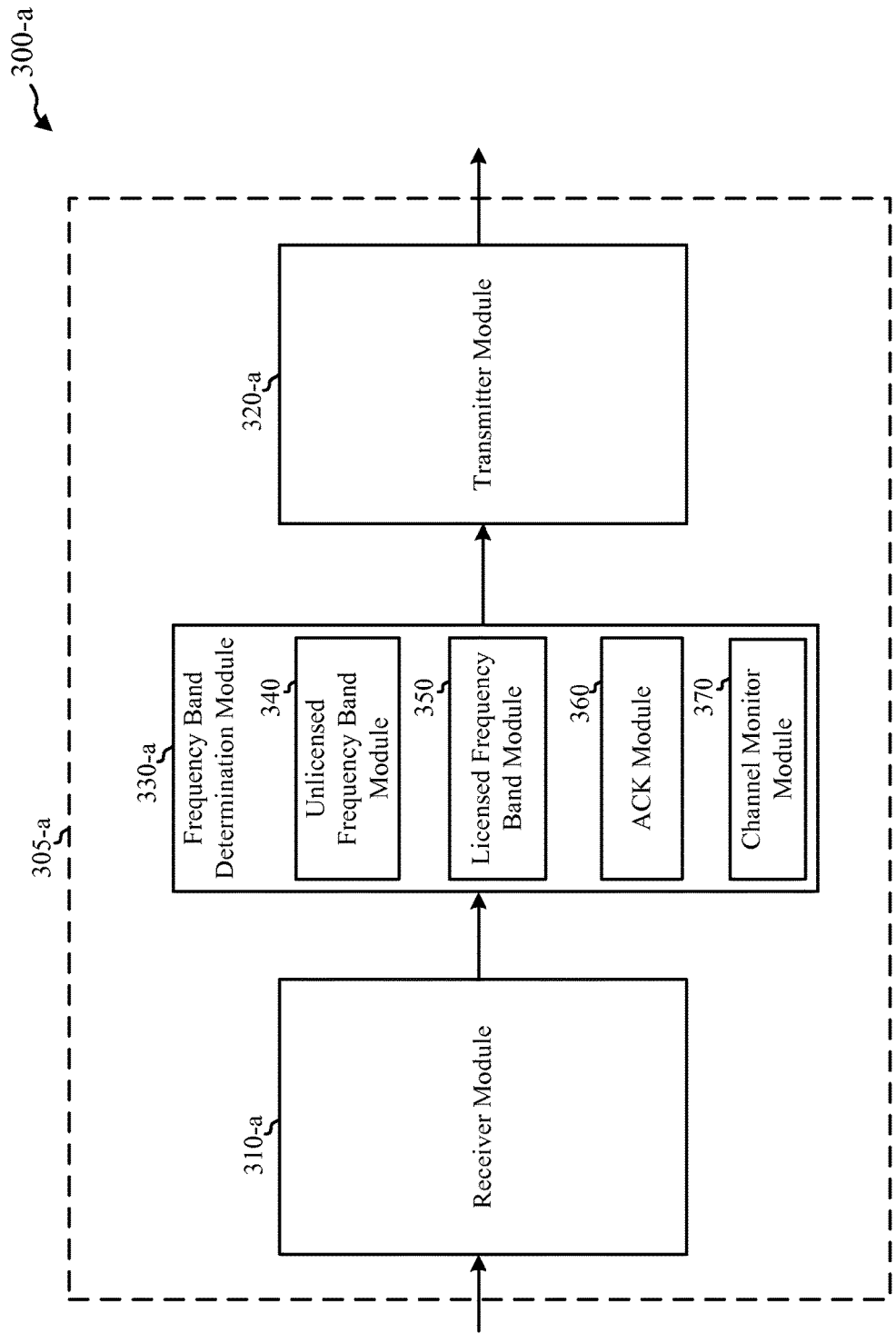

Next, FIG. 3B shows a block diagram 300-a of a device 305-a configured to operate using either or both licensed frequency bands and unlicensed frequency bands, in accordance with various embodiments. The device 305-a may illustrate, for example, aspects of the UEs 115 illustrated in FIG. 1 or 2. In some embodiments, the device 305-a illustrates aspects of base stations 105 described with reference to FIG. 1 or 2. The device 305-a may include a receiver module 310-a, a transmitter module 320-a and/or a frequency determination module 330-a. Each of these components may be in communication with each other; and each may perform substantially the same functions as the corresponding modules illustrated in FIG. 3A. In some embodiments, the device 305-*a* is a processor.

The components of the device 305-*a* may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The frequency band determination module 330-*a* may include an unlicensed frequency band module 340, a licensed frequency band module 350, an acknowledgment (ACK) module 360, and/or a channel monitor module 370. The unlicensed frequency band module 340 may be configured to prepare data packets for transmission using the unlicensed frequency band. This may include determining if the unlicensed frequency band is appropriate to use and/or preferred for data packets and/or a subset of the data packets. For example, the unlicensed frequency band module 340 may determine whether the unlicensed frequency band is preferred based on channel conditions of the unlicensed frequency band. In some cases, the unlicensed frequency band module 340 determines whether data packets should be sent on the unlicensed frequency band based on whether previous transmissions on the unlicensed frequency band were successful. Additionally or alternatively, the unlicensed frequency band module 340 may determine whether data packets should be sent based on a time delay (e.g., a time delay expiration) associated with ACK message.

The licensed frequency band module 350 may be configured to prepare data packets for transmission using the licensed frequency band. This may include determining if the licensed frequency band is appropriate to use and/or preferred for data packets and/or a subset of the data packets. For example, the licensed frequency band module 350 may determine whether the licensed frequency band is preferred based on channel conditions of the licensed frequency band. In some cases, the licensed frequency band module 350 determines whether data packets should be sent on the licensed frequency band based on whether previous transmissions on the unlicensed frequency band were successful. Additionally or alternatively, the licensed frequency band module 350 may determine whether data packets should be sent based on a time delay (e.g., a time delay expiration) associated with ACK message.

The ACK module 360 may be configured to prepare ACK messages for transmission or to identify ACK messages that have been received. The ACK module 360 may be in communication with the licensed frequency band module 350 and/or the unlicensed frequency band module 340 to determine whether to transmit an ACK message using the licensed frequency band and/or the unlicensed frequency band.

The channel monitor module 370 may be configured to monitor channel conditions. The channel monitor module 370 may communicate with the licensed frequency band module 350 and/or the unlicensed frequency band module 340 to monitor channel conditions on the licensed frequency band and/or the unlicensed frequency band. In some cases, the device 305-*a* may not include the ACK module 360 and/or the channel monitor module 370.

Figure 4A:
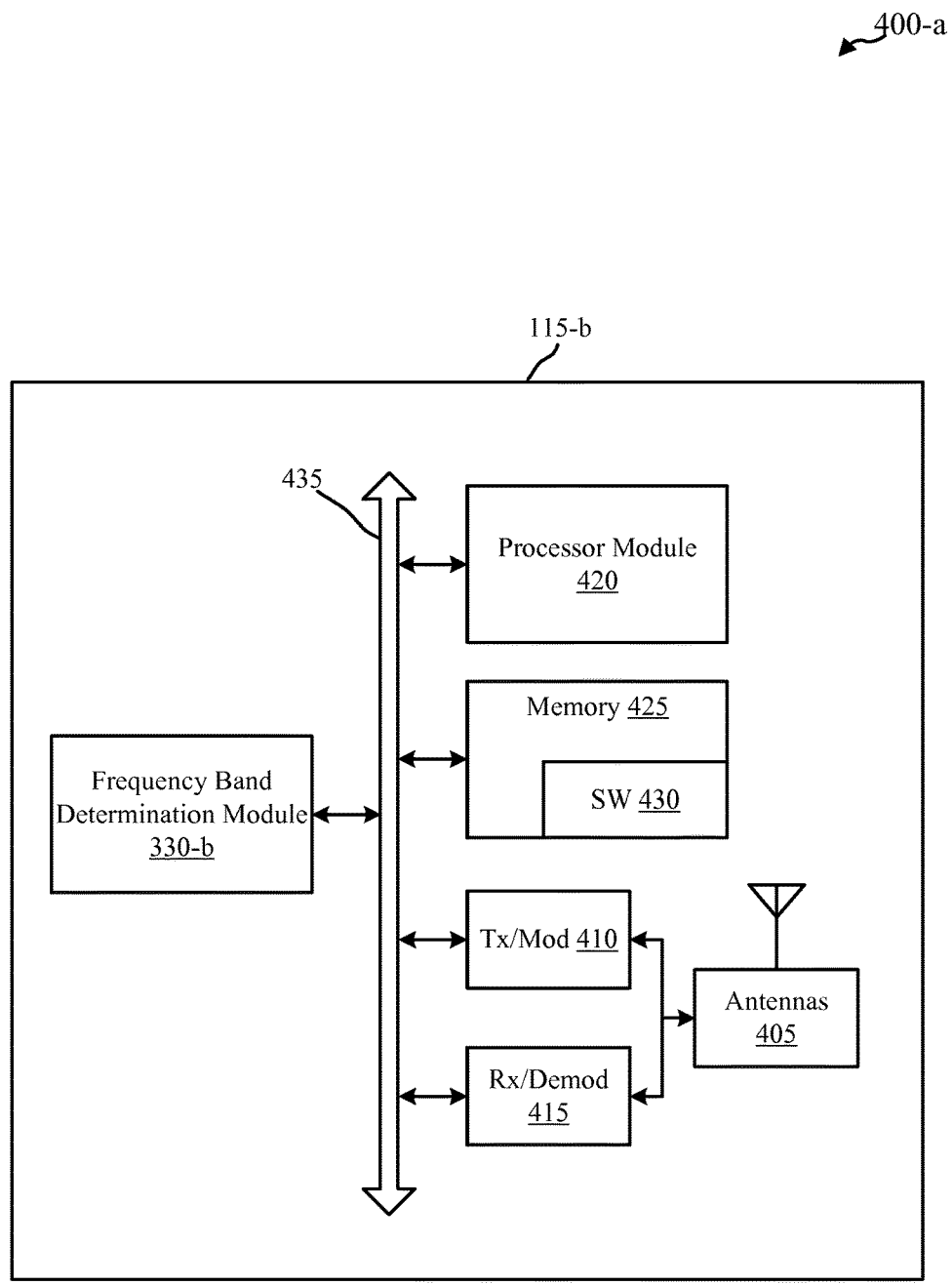
FIGS. 4A and 4B show block diagrams of systems configured to operate according to various embodiments.

Turning now to FIG. 4A, which shows a block diagram 400-*a* of a mobile device 115-*b* configured to operate using either or both licensed frequency bands and unlicensed frequency bands, in accordance with various embodiments. The mobile device 115-*b* may have any of various configurations, such as personal computers (e.g., laptop computers, netbook computers, tablet computers, etc.), cellular telephones, PDAs, smartphones, digital video recorders (DVRs), internet appliances, gaming consoles, e-readers, etc. The mobile device 115-*b* may have an internal power supply (not shown), such as a small battery, to facilitate mobile operation. In some embodiments, the mobile device 115-*b* may be the mobile devices 115 of FIG. 1 or 2.

The mobile device 115-*b* may generally include components for bi-directional voice and data communications including components for transmitting communications and components for receiving communications. The mobile device 115-*b* may include antenna(s) 405, a transmitter module 410, a receiver module 415, a processor module 420, and memory 425 (and software (SW) 430), which each may communicate, directly or indirectly, with each other (e.g., via one or more buses 435). The transmitter module 410 and receiver module 415 may be aspects of a single transceiver module configured to communicate bi-directionally, via the antenna(s) 405 and/or one or more wired or wireless links, with one or more networks, as described above. For example, the transmitter module 410 and the receiver module 415 may be configured to communicate bi-directionally with base stations 105 of FIG. 1 or 2. The transmitter module 410 and the receiver module 415 may be aspects of, or include a modem configured to modulate the packets and provide the modulated packets to the antenna(s) 405 for transmission, and to demodulate packets received from the antenna(s) 405. While the mobile device 115-*b* may include a single antenna 405, the mobile device 115-*b* may have multiple antennas 405 capable of concurrently transmitting and/or receiving multiple wireless transmissions.

The memory 425 may include random access memory (RAM) and read-only memory (ROM). The memory 425 may store computer-readable, computer-executable software/firmware code 430 containing instructions that are configured to, when executed, cause the processor module 420 to perform various functions described herein (e.g., determine whether to transmit packets on licensed or unlicensed spectrum, evaluate channel condition, recognize ACK messages and/or a time delay associated with an ACK message, etc.). Alternatively, the software/firmware code 430 may not be directly executable by the processor module 420 but be configured to cause a computer (e.g., when compiled and executed) to perform functions described herein.

The processor module 420 may include an intelligent hardware device, e.g., a central processing unit (CPU), a microcontroller, an application-specific integrated circuit (ASIC), etc. The mobile device 115-*b* may include a speech encoder (not shown) configured to receive audio via a microphone, convert the audio into packets (e.g., 20 ms in length, 30 ms in length, etc.) representative of the received audio, provide the audio packets to the transmitter module 410 and/or receiver module 415, and provide indications of whether a user is speaking.

According to the architecture of FIG. 4A, the mobile device 115-*b* may further include a frequency band determination module 330-*b*, which may be substantially the same as the corresponding module of devices 305 of FIGS.

3A and 3B. In some cases, the frequency band determination module 330-*b* is configured to perform the functions of the unlicensed frequency band module 340, the licensed frequency band module 350, the ACK module 360 and/or the channel monitor module 370 described with reference to FIG. 3B.

By way of example, the frequency band determination module may be a component of the mobile device 115-*b* in communication with some or all of the other components of the mobile device 115-*b* via a bus. Alternatively, functionality of the frequency band determination module 330-*b* may be implemented as a component of the transmitter module 410, the receiver module 415, as a computer program product, and/or as one or more controller elements of the processor module 420.

Figure 4B:
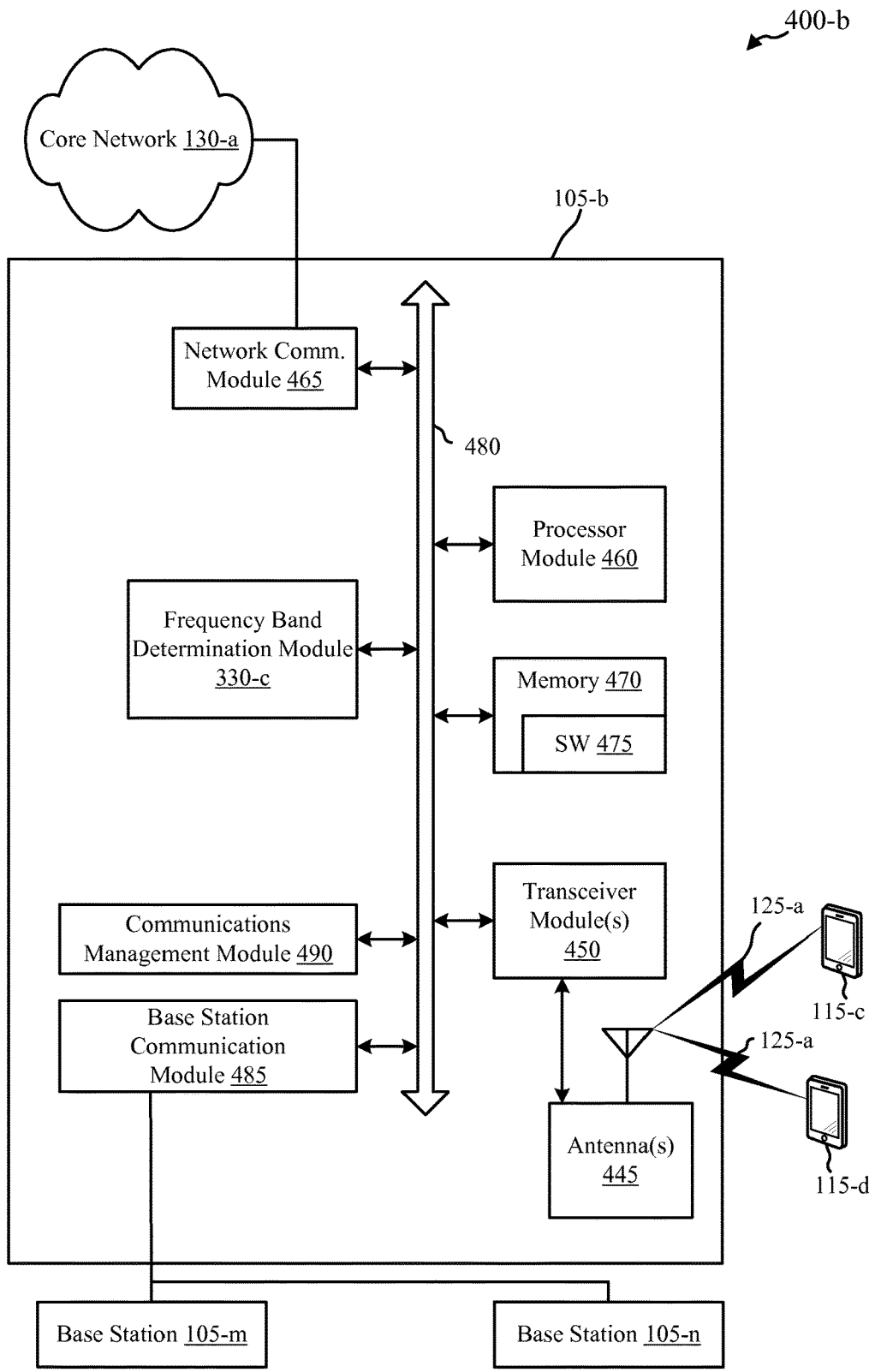

FIG. 4B shows a block diagram 400-*b* of a system configured to operate using either or both licensed frequency bands and unlicensed frequency bands, in accordance with various embodiments. This system 400-*b* may be an example of aspects of the systems 100 or 200 depicted in FIG. 1 or 2. The system 400-*b* may include a base station 105-*b* configured for communication with UEs 115 over wireless communication links 125. Base station 105-*b* may be capable of receiving communication links 125 from other base stations (not shown). Base station 105-*b* may be, for example, an eNB 105 as illustrated in systems 100 or 200.

In some cases, the base station 105-*b* may have one or more wired or wireless backhaul links. Base station 105-*b* may be, for example, a macro eNB 105 having a wired backhaul link (e.g., S1 interface, etc.) to the core network 130-*a*. Base station 105-*b* may also communicate with other base stations 105, such as base station 105-*m* and base station 105-*n* via inter-base station communication links (e.g., X2 interface, etc.). Each of the base stations 105 may communicate with UEs 115 using the same or different wireless communications technologies. In some cases, base station 105-*b* may communicate with other base stations such as 105-*m* and/or 105-*n* utilizing base station communication module 485. In some embodiments, base station communication module 485 may provide an X2 interface within an LTE/LTE-A wireless communication network technology to provide communication between some of the base stations 105. In some embodiments, base station 105-*b* may communicate with other base stations through core network 130-*a*. In some cases, the base station 105-*b* may communicate with the core network 130-*a* through network communications module 465.

The components for base station 105-*b* may be configured to implement aspects discussed above with respect to base stations 105 of FIGS. 1 and 2 and/or devices 305 of FIGS. 3A, and 3B, and may not be repeated here for the sake of brevity. For example, the base station 105-*b* may be configured to determine whether to transmit packets on licensed or unlicensed spectrum, evaluate channel conditions, recognize ACK messages, and/or a time delay associated with an ACK message.

The base station 105-*b* may include antennas 445, transceiver modules 450, and a processor module 460, and memory 470 (including software (SW) 475), which each may be in communication, directly or indirectly, with each other (e.g., over bus system 480). The transceiver modules 450 may be configured to communicate bi-directionally, via the antennas 445, with the UEs 115, which may be multi-mode devices. The transceiver module 450 (and/or other components of the base station 105-*b*) may also be configured to communicate bi-directionally, via the antennas 445, with one or more other base stations (not shown). The transceiver module 450 may include a modem configured to modulate the packets and provide the modulated packets to the antennas 445 for transmission, and to demodulate packets received from the antennas 445. The base station 105-*b* may include multiple transceiver modules 450, each with one or more associated antennas 445.

The memory 470 may include random access memory (RAM) and read-only memory (ROM). The memory 470 may also store computer-readable, computer-executable software code 475 containing instructions that are configured to, when executed, cause the processor module 460 to perform various functions described herein (e.g., determine whether to transmit packets on licensed or unlicensed spectrum, evaluate channel condition, recognize ACK messages and/or a time delay associated with an ACK message, etc.). Alternatively, the software 475 may not be directly executable by the processor module 460 but be configured to cause the computer, e.g., when compiled and executed, to perform functions described herein.

The processor module 460 may include an intelligent hardware device, e.g., a central processing unit (CPU), a microcontroller, an application-specific integrated circuit (ASIC), etc. The processor module 460 may include various special purpose processors such as encoders, queue processing modules, base band processors, radio head controllers, digital signal processors (DSPs), and the like.

According to the architecture of FIG. 4B, the base station 105-*b* may further include a communications management module 490. The communications management module 490 may manage communications with other base stations 105. The communications management module may include a controller and/or scheduler for controlling communications with UEs 115 in cooperation with other base stations 105. For example, the communications management module 490 may perform scheduling for transmissions to UEs 115 and/or various interference mitigation techniques, including evaluating channel conditions and/or determining whether to transmit on licensed or unlicensed spectrum.

In some embodiments, the base station 105-*b* includes a frequency band determination module 330-*c*, which may be substantially the same as the corresponding module of devices 305 of FIGS. 3A and 3B, or frequency band determination module 330-*b* of FIG. 4A. In some cases, the frequency band determination module 330-*c* is configured to perform the functions of the unlicensed frequency band module 340, the licensed frequency band module 350, the ACK module 360, and/or the channel monitor module 370 described with reference to FIG. 3B.

By way of example, the frequency band determination module 330-*c* may be a component of the base station 105-*b* in communication with some or all of the other components of the base station 105-*b* via a bus. Alternatively, functionality of the frequency band determination module 330-*c* may be implemented as a component of the transceiver module 450, as a computer program product, and/or as one or more controller elements of the processor module 460.

Figure 5:
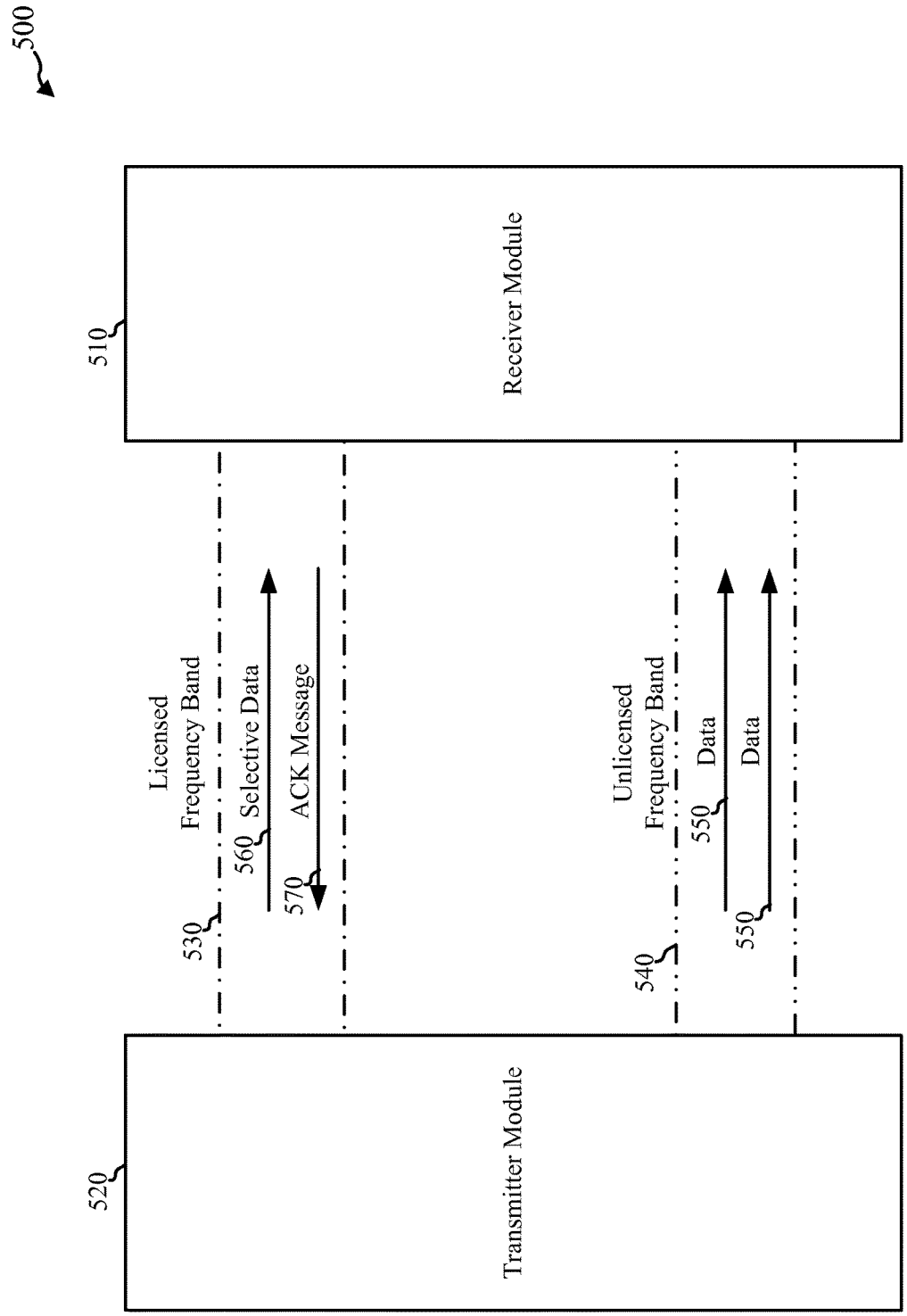
FIG. 5 shows a block diagram of a communication system configured to operate according to various embodiments.

FIG. 5 shows a block diagram 500 of a communication system 500 configured to operate using either or both a licensed frequency band and an unlicensed frequency band, in accordance with various embodiments. This system 500 includes a transmitter module 520 and a receiver module 510. In some cases, the transmitter module 520 may illustrate, for example, aspects of the transmitter module 320 illustrated in FIG. 3A or 3B, the transmitter module 410 illustrated in FIG. 4A, and/or the transceiver module 450 illustrated in FIG. 4B. In some cases, the receiver module 510 may illustrate, for example, aspects of the receiver module 310 illustrated in FIG. 3A or 3B, the receiver module 415 illustrated in FIG. 4A, and/or the transceiver module 450 illustrated in FIG. 4B. In some cases, the transmitter module 520 is a component of a base station 105, such as those referenced with respect to FIG. 1 or 2, and the receiver module 510 is a component of a mobile device 115, such as those referenced with respect to FIG. 1 or 2, or vice versa. In various embodiments, the transmitter module 520 and/or the receiver module 510 is a component of a core network 130 (FIG. 1). An unlicensed frequency band 540 and/or licensed frequency band 530 may be a component of a backhaul link 132 or 134 (FIG. 1).

The transmitter module 520 may communicate with the receiver module 510 via a licensed frequency band 530 and/or an unlicensed frequency band 540. A flow of packets, such as data packets 550 or 560, may be transmitted from the transmitter module 520 to the receiver module 510. In some cases, the flow of packets include transmission control protocol (TCP) packets. Upon receiving the flow of packets, the receiver module 510 may return an acknowledgment (ACK) message 570 to the transmitter module 520 to confirm successful transmission of the flow of packets. If an ACK message 570 is not received by the transmitter module 520, it may signify that the transmission of the flow of packets 550 was unsuccessful. In some cases, the transmitter module 520 may prefer to send most data 550 using the unlicensed frequency band 540. However, such as to improve reliability, a subset of the data 560 may be transmitted and/or retransmitted to the receiver module 510 using the licensed frequency band 530. The selective data 560 may include higher priority data, data that has failed to successfully transmit from the transmitter module 520 to the receiver module 510, and/or other data that has been designated to be transmitted using the licensed frequency band 530. In some embodiments, the ACK message 570 is always transmitted using the licensed frequency band 530 so as to reliably determine whether the data was successfully transmitted.

Figure 6:
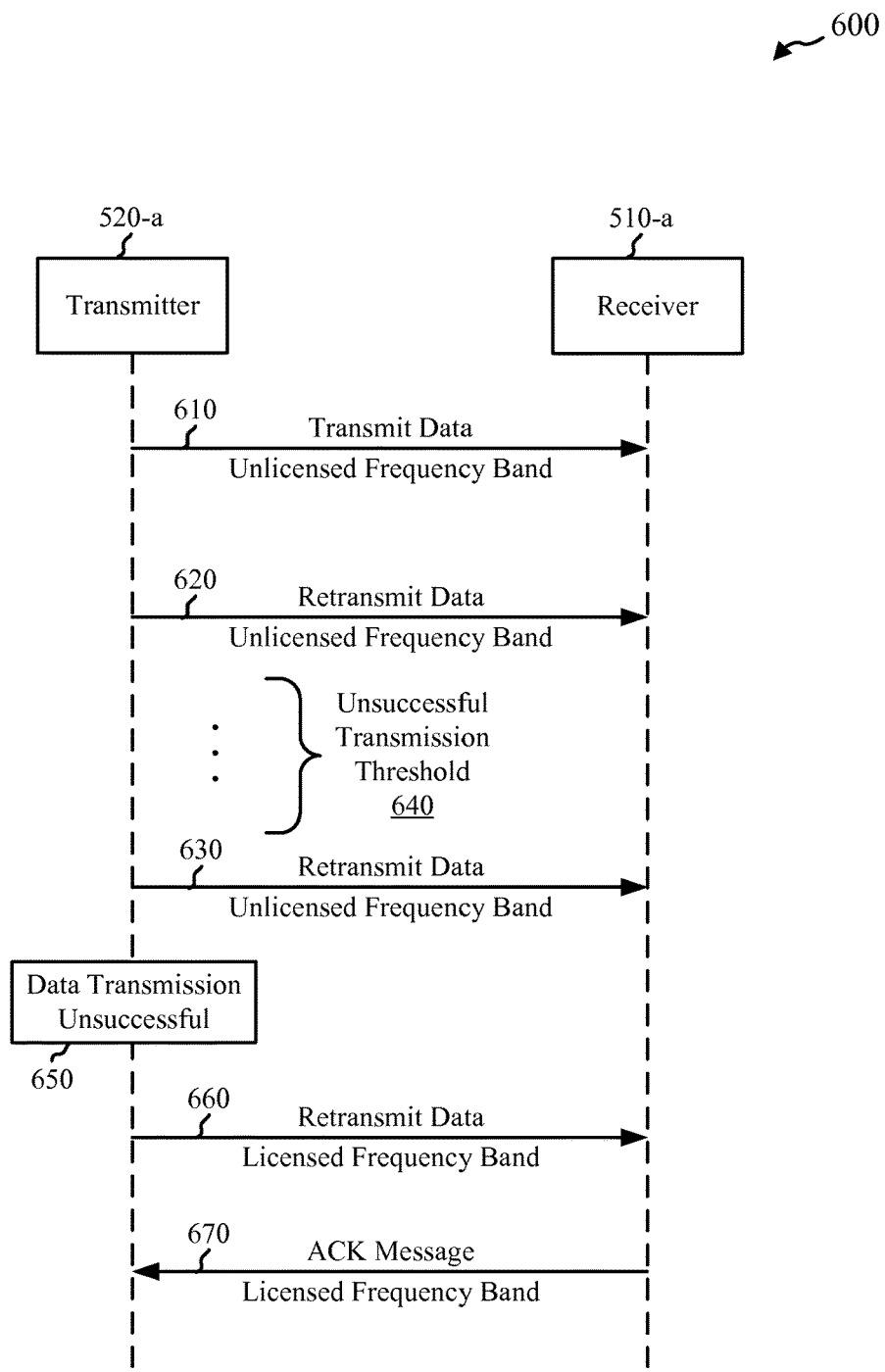
FIG. 6 is a call flow diagram of a communication system configured to operate according to various embodiments.

Next, FIG. 6 depicts a call flow diagram of a communication system 600 configured to operate using either or both licensed and unlicensed frequency bands, in accordance with various embodiments. In some embodiments, the transmitter 520-a may illustrate aspects of the transmitter module 520 of FIG. 5 and/or the receiver 510-a may illustrate aspects of the receiver module 510 of FIG. 5.

The transmitter 520-a may attempt to transmit data 610, such as a flow of packets, to the receiver 510-a using an unlicensed frequency band. The transmitter 520-a may attempt to retransmit 620 the data using the unlicensed frequency band. The transmitter may, for example, retransmit the data because an ACK message was not received to indicate a successful transmission. The number of retransmission attempts 620 through 630 using the unlicensed frequency band may exceed an unsuccessful transmission attempt threshold 640. The transmitter 520-a may determine 650 that data transmission was unsuccessful—e.g., based on exceeding the unsuccessful transmission attempt threshold 640. The transmitter 520-a may attempt to retransmit 660 the data, or a subset of the data, using the licensed frequency band. The receiver 510-a may return 670 an ACK message to the transmitter 520-a. The ACK message may be in response to a successful transmission of the data.

Figure 7:
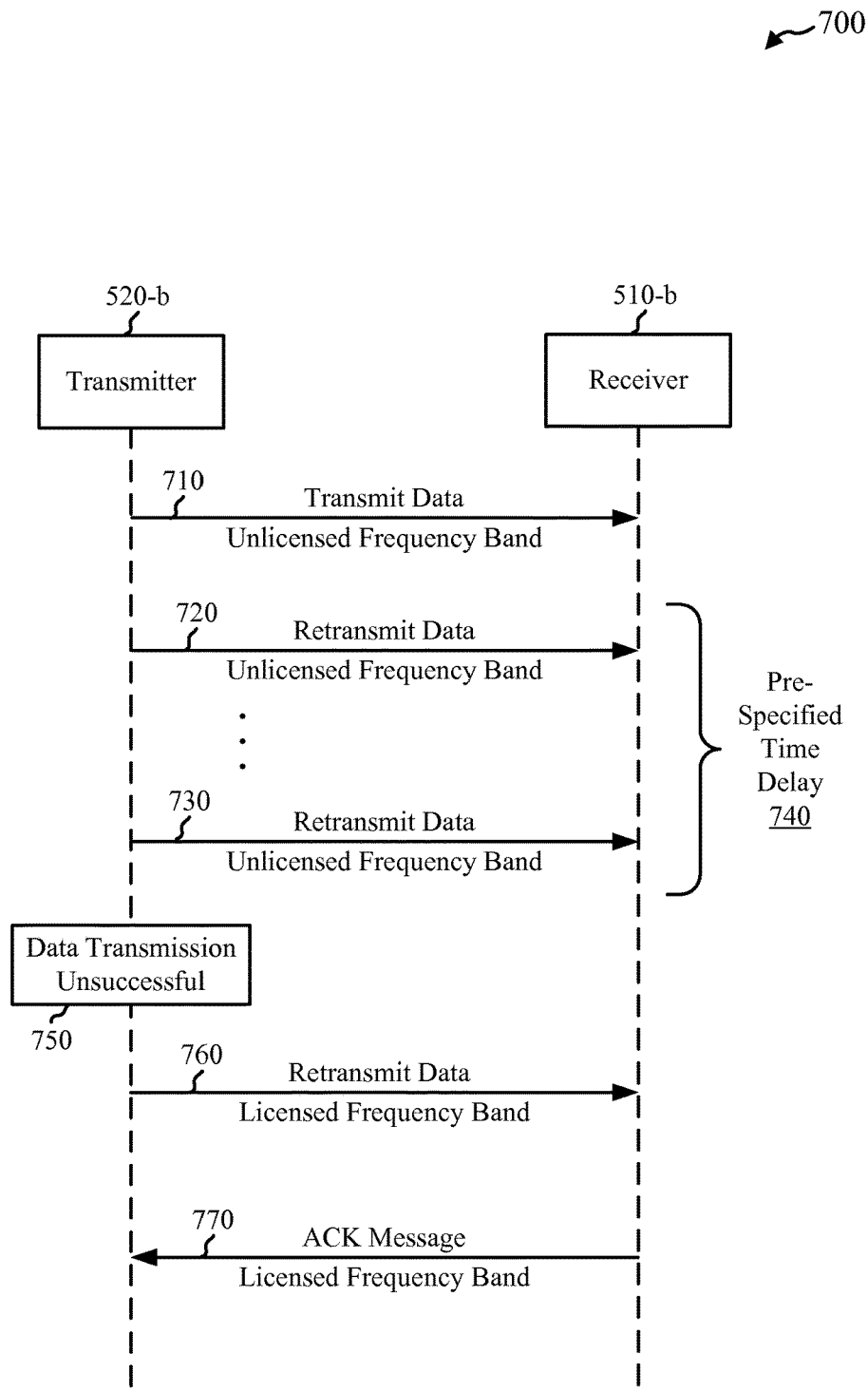
FIG. 7 is a call flow diagram of a communication system configured to operate according to various embodiments.

FIG. 7 depicts a call flow diagram of a communication system 700 configured to operate using either or both licensed and unlicensed frequency bands, in accordance with various embodiments. In some embodiments, the transmitter 520-b may illustrate aspects of the transmitter module 520 of FIG. 5 and/or the receiver 510-b may illustrate aspects of the receiver module 510 of FIG. 5.

The transmitter 520-b may attempt to transmit 710 data, such as a flow of packets, to the receiver 510-b using an unlicensed frequency band. The transmitter 520-b may attempt to retransmit 720, 730 the data several times using the unlicensed frequency band. The transmitter may retransmit the data because an ACK message was not received to indicate a successful transmission. The time that has elapsed 740 between the first attempt to transmit 710 data and/or retransmit 720, 730 data using the unlicensed frequency band may exceed a pre-specified, or pre-determined, time delay. The transmitter 520-b may determine 750 that data transmission was unsuccessful—e.g., based on exceeding the pre-specified time delay. The transmitter 520-b may attempt to retransmit 760 the data, or a subset of the data, using the licensed frequency band. The receiver 510-b may return 770 an ACK message to the transmitter 520-b. The ACK message may be in response to a successful transmission of the data.

Figure 8:
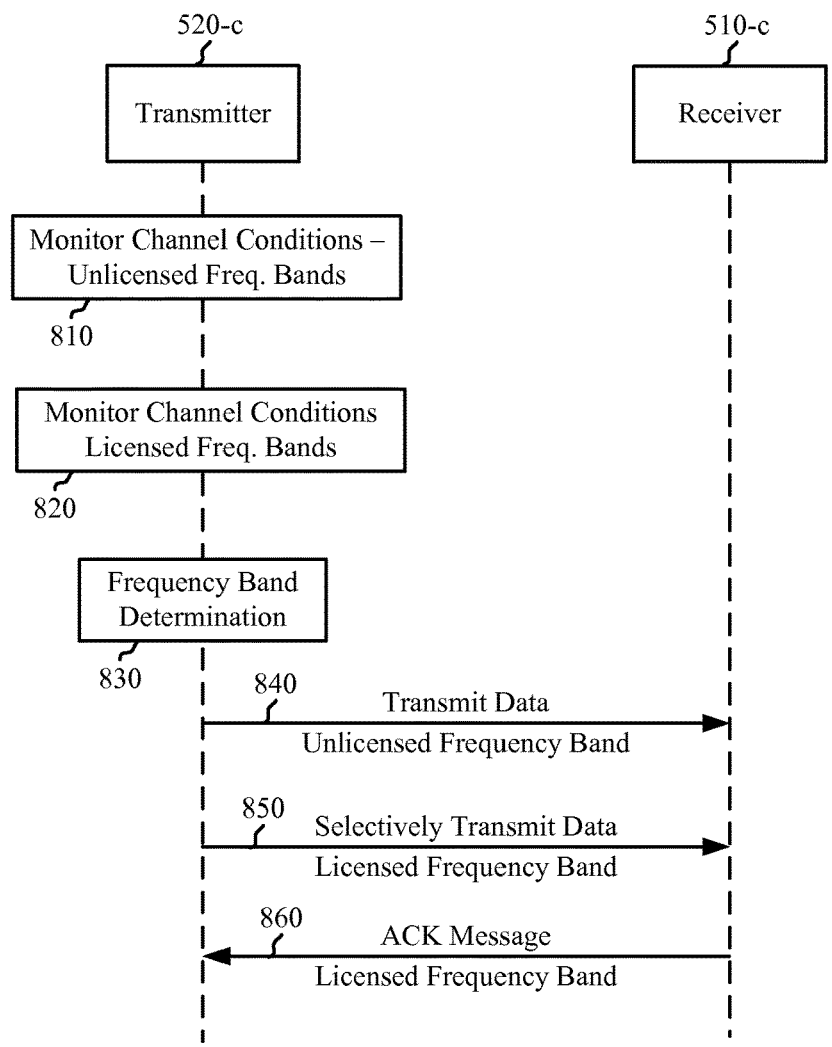
FIG. 8 is a call flow diagram of a communication system configured to operate according to various embodiments.

FIG. 8 depicts a call flow diagram of a communication system 800 configured to operate using both licensed and unlicensed frequency bands, in accordance with various embodiments. In some embodiments, the transmitter 520-c may illustrate aspects of the transmitter module 520 of FIG. 5 and/or the receiver 510-c may illustrate aspects of the receiver module 510 of FIG. 5.

The transmitter 520-c may monitor 810 channel conditions of the unlicensed frequency band. Monitoring channel conditions may include measuring signal to noise ratio, measuring signal strength, measuring interference, measuring bandwidth, and/or other measurements performed on a frequency band. The transmitter 520-c may monitor 820 channel conditions of the licensed frequency band. The transmitter 520-c may determine 830 which frequency band to use for transmission. The determination 830 may be based at least in part on the measured channel conditions of the licensed frequency band and/or the unlicensed frequency band. The frequency band may differ for different packets of data. In some cases, it is preferred to send data using the unlicensed frequency band, however the unlicensed frequency band may not always be reliable. For data packets that are unsuccessfully transmitted using the unlicensed frequency band, retransmission may occur using the licensed frequency band. In some cases, data is sent using the unlicensed frequency band and a subset of the data is sent using the licensed frequency band.

Data may be transmitted 840 from the transmitter 520-c to the receiver 510-c using the unlicensed frequency band. Data may be selectively transmitted 850 from the transmitter 520-c to the receiver 510-c using the licensed frequency band. Data may be selectively transmitted by retransmitting a subset of the data that was unsuccessfully transmitted using the unlicensed frequency band. In some cases, a ratio of the data is transmitted, such as by using the available bandwidth of the licensed frequency band, using the licensed frequency band, with the remaining data transmitted using the unlicensed frequency band. Data may be distributed between the unlicensed frequency band and the licensed frequency band based on the type of data being transmitted. For example, text messages may be transmitted using the unlicensed frequency band, while voice calls and/or emergency messages are transmitted using the licensed frequency band. The receiver 510-c may return 860 an ACK message to the transmitter 520-c acknowledging reception of the data. In some cases the ACK message is transmitted using the same frequency band as the data received. The ACK message may always be transmitted using the licensed frequency band.

In FIG. 8, the transmitter 520-*c* is depicted as monitoring 810, 820 channel conditions. But in some embodiments, the receiver 510-*c* independently and/or concurrently monitors channel conditions and determines, or suggests, a frequency band for use in transmitting data.

Figure 9:
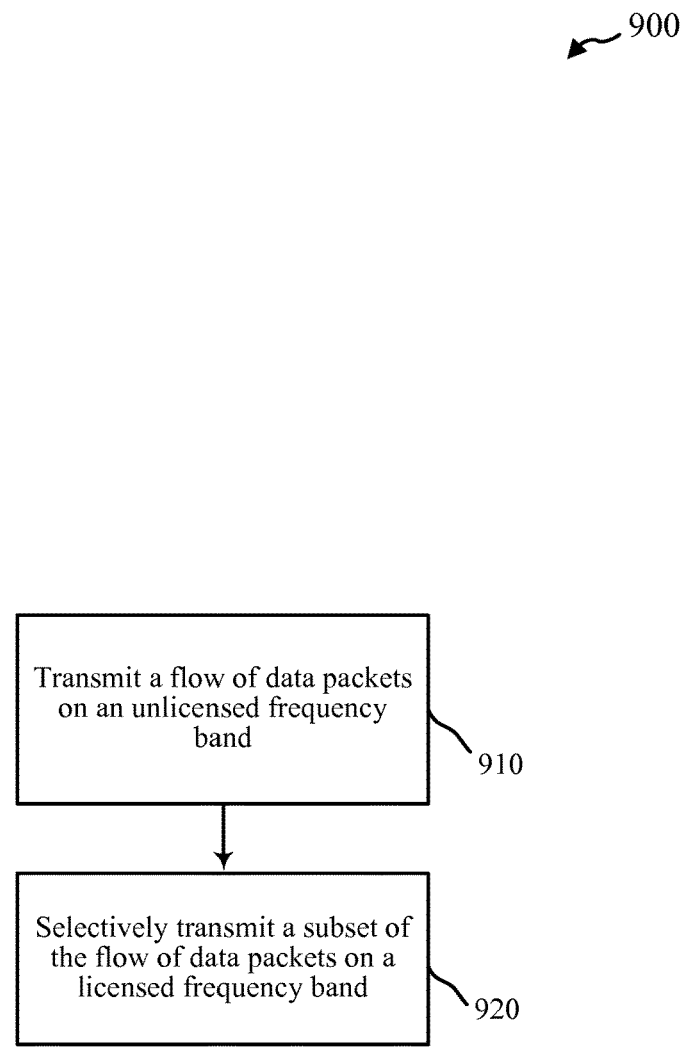
FIG. 9 is a flow diagram of a method for wireless communication according to various embodiments.

FIG. 9 depicts a flow diagram of a method 900 for operating a communications system using both a licensed frequency band and an unlicensed frequency band, in accordance with various embodiments. The method 900 may be implemented by the base stations 105 and/or the mobile devices 115 of FIG. 1, 2, 4A, or 4B, and/or by the devices 305 of FIG. 3A, or 3B, and/or by the transmitter module 520 and receiver module 510 of FIG. 5, 6, 7, or 8.

At block 910, the method may include transmitting a flow of data packets on an unlicensed frequency band. The operations of block 910 are, in various embodiments, performed by the frequency band determination module 330 of FIG. 3A, 3B, 4A or 4B and/or the unlicensed frequency band module 340 of FIG. 3B.

At block 920, the method may include selectively transmitting a subset of the flow of data packets on a licensed frequency band. The operations of block 920 are, in various embodiments, performed by the frequency band determination module 330 of FIG. 3A, 3B, 4A or 4B and/or the licensed frequency band module 350 of FIG. 3B.

Selectively transmitting the subset of the flow of data packets may comprise selectively retransmitting the subset of the flow of data packets on the licensed frequency band. In some cases, selectively transmitting the subset of the flow of data packets comprises retransmitting at least the subset of the flow of data packets on the licensed frequency band when a number of unsuccessful transmissions on the unlicensed frequency band exceeds a threshold. In some embodiments, selectively transmitting the subset of the flow of data packets comprises retransmitting at least the subset of the flow of data packets on the licensed frequency band when a time delay expires without receiving an acknowledgment message. The flow of data packets may comprise transmission control protocol packets. In some cases, the method 900 further includes receiving an ACK message on the licensed frequency band.

Figure 10:
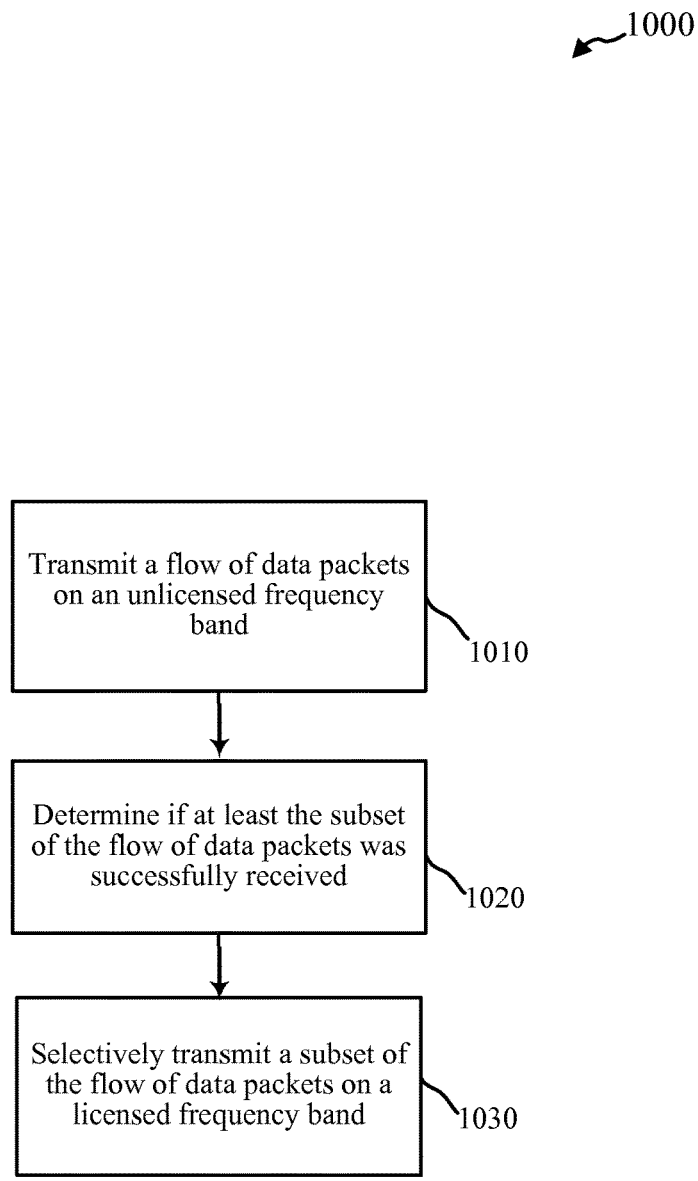
FIG. 10 is a flow diagram of a method for wireless communication according to various embodiments.

FIG. 10 depicts a flow diagram of a method 1000 for operating a communications system using both a licensed frequency band and an unlicensed frequency band, in accordance with various embodiments. The method 1000 may be implemented by the base stations 105 and/or the mobile devices 115 of FIG. 1, 2, or 4, and/or by the devices 305 of FIG. 3A, or 3B, and/or by the transmitter module 520 and receiver module 510 of FIG. 5, 6, 7, or 8.

At block 1010, the method may include transmitting a flow of data packets on an unlicensed frequency band. The operations of block 1010 are, in various embodiments, performed by the frequency band determination module 330 of FIG. 3A, 3B, 4A or 4B and/or by the unlicensed frequency band module 340 of FIG. 3B.

At block 1020, the method may include determining if at least the subset of the flow of data packets was successfully received. In some cases, determining if at least the subset of the flow of data packets was successfully received comprises determining whether an acknowledgment message was received. The operations of block 1020 are, in various embodiments, performed by the frequency band determination module 330 of FIG. 3A, 3B, 4A or 4B, the unlicensed frequency band module 340 of FIG. 3B, and/or the ACK module 360 of FIG. 3B.

At block 1030, the method may include selectively transmitting a subset of the flow of data packets on a licensed frequency band. The operations of block 1030 are, in various embodiments, performed by the frequency band determination module 330 of FIG. 3A, 3B, 4A or 4B, and/or the licensed frequency band module 350 of FIG. 3B.

Figure 11:
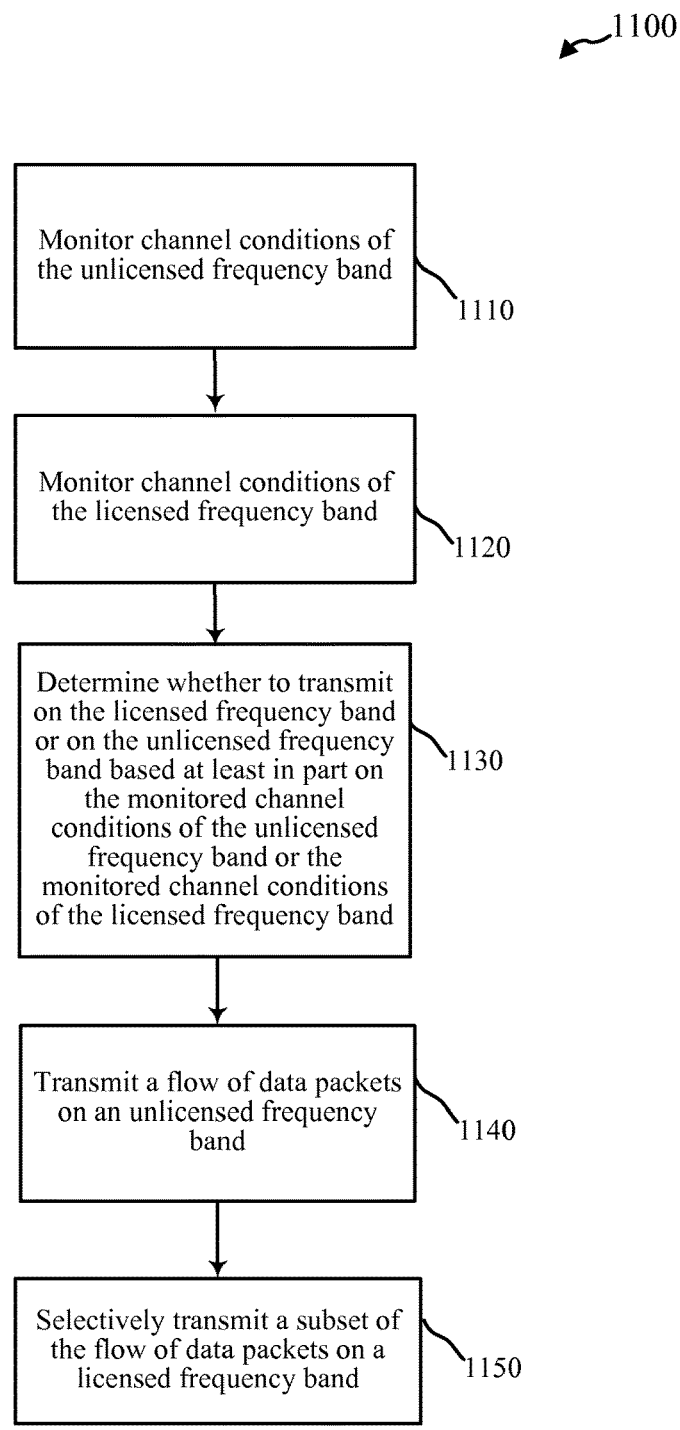
FIG. 11 is a flow diagram of a method for wireless communication according to various embodiments.

FIG. 11 depicts a flow diagram of a method 1100 for operating a communications system using both a licensed frequency band and an unlicensed frequency band, in accordance with various embodiments. The method 1100 may be implemented by the base stations 105 and/or the mobile devices 115 of FIG. 1, 2, or 4, and/or by the devices 305 of FIG. 3A, or 3B, and/or by the transmitter module 520 and receiver module 510 of FIG. 5, 6, 7, or 8.

At block 1110, the method may include monitoring channel conditions of the unlicensed frequency band. The operations of block 1110 are, in various embodiments, performed by the frequency band determination module 330 of FIG. 3A, 3B, 4A or 4B, the unlicensed frequency band module 340 of FIG. 3B, and/or the channel monitor module 370 of FIG. 3B.

At block 1120, the method may include monitoring channel conditions of the licensed frequency band. In some cases, monitoring channel conditions of the unlicensed frequency band and monitoring channel conditions of the licensed frequency band are performed simultaneously. The operations of block 1120 are, in various embodiments, performed by the frequency band determination module 330 of FIG. 3A, 3B, 4A or 4B, the licensed frequency band module 350 of FIG. 3B, and/or the channel monitor module 370 of FIG. 3B.

At block 1130, the method may include determining whether to transmit on the licensed frequency band or on the unlicensed frequency band based at least in part on the monitored channel conditions of the unlicensed frequency band or the monitored channel conditions of the licensed frequency band. The operations of block 1130 are, in various embodiments, performed by the frequency band determination module 330 of FIG. 3A, 3B, 4A or 4B, the unlicensed frequency band module 340 of FIG. 3B, the licensed frequency band module 350 of FIG. 3B, and/or the channel monitor module 370 of FIG. 3B.

At block 1140, the method may include transmitting a flow of data packets on an unlicensed frequency band. The operations of block 1140 are, in various embodiments, performed by the frequency band determination module 330 of FIG. 3A, 3B, 4A or 4B, and/or the unlicensed frequency band module 340 of FIG. 3B.

At block 1150, the method may include selectively transmitting a subset of the flow of data packets on a licensed frequency band. The operations of block 1150 are, in various embodiments, performed by the frequency band determination module 330 of FIG. 3A, 3B, 4A or 4B, and/or the licensed frequency band module 350 of FIG. 3B.

Those skilled in the art will recognize that the methods 900, 1000, and 1100 are example implementations of the tools and techniques described herein. The methods may be performed with more or fewer steps; and they may be performed in an order other than indicated.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description below, although the techniques are applicable beyond LTE applications.

The detailed description set forth above in connection with the appended drawings describes exemplary embodiments and does not represent the only embodiments that may be implemented or that are within the scope of the claims. The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of wireless communication, the method comprising:
   preparing a set of data packets for transmission on an unlicensed frequency band;
   transmitting the prepared set of data packets on the unlicensed frequency band;
   receiving, on a licensed frequency band, an acknowledgement (ACK) message indicating that a first subset of the prepared set of data packets was successfully transmitted on the unlicensed frequency band;
   selecting a second subset of the prepared set of data packets that were previously transmitted on the unlicensed frequency band for retransmission on the licensed frequency band, the second subset of the prepared set of data packets being different from the first subset of the prepared set of data packets, the selecting based at least in part on not receiving an ACK message indicating that the second subset of the prepared set of data packets was successfully transmitted on the unlicensed frequency band, and the selecting based at least in part on a number of one or more unsuccessful transmissions on the unlicensed frequency band exceeding a threshold; and retransmitting, on the licensed frequency band, the second subset of the prepared set of data packets that were previously transmitted on the unlicensed frequency band.

2. The method of claim 1, wherein selecting the second subset of the prepared set of data packets is based at least in part a time delay expiring without receiving an ACK message indicating that the second subset of the prepared set of data packets was successfully transmitted on the unlicensed frequency band.

3. The method of claim 1, further comprising:
monitoring channel conditions of the unlicensed frequency band; and
monitoring channel conditions of the licensed frequency band.

4. The method of claim 3, wherein monitoring the unlicensed frequency band and monitoring the licensed frequency band are performed simultaneously.

5. The method of claim 3, further comprising:
determining whether to transmit on the licensed frequency band or on the unlicensed frequency band based at least in part on the monitored channel conditions of the unlicensed frequency band or the monitored channel conditions of the licensed frequency band.

6. The method of claim 1, further comprising:
receiving, on the licensed frequency band, an ACK message indicating that the second subset of the prepared set of data packets was successfully retransmitted on the licensed frequency band.

7. The method of claim 1, wherein the prepared set of data packets transmitted on the unlicensed frequency band comprises Transmission Control Protocol (TCP) packets, and the second subset of the prepared set of data packets retransmitted on the licensed frequency band comprises a subset of the TCP packets.

8. The method of claim 1, further comprising:
detecting interference on the unlicensed frequency band, wherein selecting the second subset of the prepared set of data packets is based at least in part on the detected interference on the unlicensed frequency band.

9. The method of claim 1, further comprising:
receiving reporting information about channel conditions on the unlicensed frequency band, wherein selecting the second subset of the prepared set of data packets is based at least in part on the received reporting information about channel conditions on the unlicensed frequency band.

10. A system for wireless communication, the system comprising:
means for preparing a set of data packets for transmission on an unlicensed frequency band;
means for transmitting the prepared set of data packets on the unlicensed frequency band;
means for receiving, on a licensed frequency band, an acknowledgment (ACK) message indicating that a first subset of the prepared set of data packets was successfully transmitted on the unlicensed frequency band;
means for selecting a second subset of the prepared set of data packets that were previously transmitted on the unlicensed frequency band for retransmission on the licensed frequency band, the second subset of the prepared set of data packets being different from the first subset of the prepared set of data packets, the selecting selecting based at least in part on not receiving an ACK message indicating that the second subset of the prepared set of data packets was successfully transmitted on the unlicensed frequency band, and the selecting based at least in part on a number of one or more unsuccessful transmissions on the unlicensed frequency band exceeding a threshold; and
means for retransmitting, on the licensed frequency band, the second subset of the prepared set of data packets that were previously transmitted on the unlicensed frequency band.

11. The system of claim 10, further comprising:
means for monitoring channel conditions of the unlicensed frequency band; and
means for monitoring channel conditions of the licensed frequency band.

12. The system of claim 11, further comprising:
means for determining whether to transmit on the licensed frequency band or on the unlicensed frequency band based at least in part on the monitored channel conditions of the unlicensed frequency band or the monitored channel conditions of the licensed frequency band.

13. The system of claim 10, further comprising:
means for receiving, on the licensed frequency band, an ACK message indicating that the second subset of the prepared set of data packets was successfully retransmitted on the licensed frequency band.

14. An apparatus for wireless communication, the apparatus comprising:
a processor;
a memory in electronic communication with the processor; and
instructions stored in the memory, the instructions being executable by the processor to:
prepare a set of data packets for transmission on an unlicensed frequency band;
transmit the prepared set of data packets on the unlicensed frequency band;
receive, on a licensed frequency band, an acknowledgment (ACK) message indicating that a first subset of the prepared set of data packets was successfully transmitted on the unlicensed frequency band;
select a second subset of the prepared set of data packets that were previously transmitted on the unlicensed frequency band for retransmission on the licensed frequency band, the second subset of the prepared set of data packets being different from the first subset of the prepared set of data packets, the selecting selecting based at least in part on not receiving an ACK message indicating that the second subset of the prepared set of data packets was successfully transmitted on the unlicensed frequency band, and the selecting based at least in part on a number of one or more unsuccessful transmissions on the unlicensed frequency band exceeding a threshold; and
retransmit, on the licensed frequency band, the second subset of the prepared set of data packets that were previously transmitted on the unlicensed frequency band.

15. The apparatus of claim 14, wherein the instructions are executable by the processor to:

monitor channel conditions of the unlicensed frequency band; and monitor channel conditions of the licensed frequency band.

16. The apparatus of claim 15, wherein the instructions are executable by the processor to:

determine whether to transmit on the licensed frequency band or on the unlicensed frequency band based at least in part on the monitored channel conditions of the unlicensed frequency band or the monitored channel conditions of the licensed frequency band.

17. The apparatus of claim 14, wherein the instructions are executable by the processor to:

receive, on the licensed frequency band, an ACK message indicating that the second subset of the prepared set of data packets was successfully retransmitted on the licensed frequency band.

18. The apparatus of claim 14, wherein the instructions are executable by the processor to:

detect interference on the unlicensed frequency band, wherein selecting the second subset of the prepared set of data packets is based at least in part on the detected interference on the unlicensed frequency band.

19. The apparatus of claim 14, wherein the instructions are executable by the processor to:

receive reporting information about channel conditions on the unlicensed frequency band, wherein selecting the second subset of the prepared set of data packets is based at least in part on the received reporting information about channel conditions on the unlicensed frequency band.

20. The apparatus of claim 14, wherein the instructions to select the second subset of the prepared set of data packets are based at least in part a time delay expiring without receiving an ACK message indicating that the second subset of the prepared set of data packets was successfully transmitted on the unlicensed frequency band.

21. The apparatus of claim 15, wherein the instructions to monitor the unlicensed frequency band and the instructions to monitor the licensed frequency band are performed simultaneously.

22. The apparatus of claim 14, wherein the prepared set of data packets transmitted on the unlicensed frequency band comprises Transmission Control Protocol (TCP) packets, and the second subset of the prepared set of data packets retransmitted on the licensed frequency band comprises a subset of the TCP packets.

23. A computer program product for wireless communication, the computer program product comprising a non-transitory computer readable medium, the computer readable medium storing instructions thereon, the instructions being executable by a processor to:

prepare a set of data packets for transmission on an unlicensed frequency band;

transmit the prepared set of data packets on the unlicensed frequency band;

receive, on a licensed frequency band, an acknowledgment (ACK) message indicating that a first subset of the prepared set of data packets was successfully transmitted on the unlicensed frequency band;

select a second subset of the prepared set of data packets that were previously transmitted on the unlicensed frequency band for retransmission on the licensed frequency band, the second subset of the prepared set of data packets being different from the first subset of the prepared set of data packets, the selecting based at least in part on not receiving an ACK message indicating that the second subset of the prepared set of data packets was successfully transmitted on the unlicensed frequency band, and the selecting based at least in part on a number of one or more unsuccessful transmissions on the unlicensed frequency band exceeding a threshold; and retransmit, on the licensed frequency band, the second subset of the prepared set of data packets that were previously transmitted on the unlicensed frequency band.

24. The computer program product of claim 23, wherein the instructions are executable by the processor to:

monitor channel conditions of the unlicensed frequency band; and monitor channel conditions of the licensed frequency band.

25. The computer program product of claim 24, wherein the instructions are executable by the processor to:

determine whether to transmit on the licensed frequency band or on the unlicensed frequency band based at least in part on the monitored channel conditions of the unlicensed frequency band or the monitored channel conditions of the licensed frequency band.

26. The computer program product of claim 23, wherein the instructions are executable by the processor to:

receive, on the licensed frequency band, an ACK message indicating that the second subset of the prepared set of data packets was successfully retransmitted on the licensed frequency band.

* * * * *